United States Patent
Sharma et al.

(10) Patent No.: US 9,633,282 B2
(45) Date of Patent: Apr. 25, 2017

(54) CROSS-TRAINED CONVOLUTIONAL NEURAL NETWORKS USING MULTIMODAL IMAGES

(71) Applicant: XEROX CORPORATION, Norwalk, CT (US)

(72) Inventors: Arjun Sharma, Bangalore (IN); Pramod Sankar Kompalli, Hyderabad (IN)

(73) Assignee: Xerox Corporation, Norwalk, CT (US)

( * ) Notice: Subject to any disclaimer, the term of this patent is extended or adjusted under 35 U.S.C. 154(b) by 70 days.

(21) Appl. No.: 14/813,233

(22) Filed: Jul. 30, 2015

(65) Prior Publication Data

US 2017/0032222 A1    Feb. 2, 2017

(51) Int. Cl.
*G06K 9/62* (2006.01)
*G06K 9/46* (2006.01)
*G06K 9/48* (2006.01)

(52) U.S. Cl.
CPC ........ *G06K 9/6256* (2013.01); *G06K 9/4652* (2013.01); *G06K 9/48* (2013.01); *G06K 9/6232* (2013.01)

(58) Field of Classification Search
USPC .......................... 382/156, 157, 158, 159, 155
See application file for complete search history.

(56) References Cited

FOREIGN PATENT DOCUMENTS

| CN | 103544705 A | 1/2014 |
|---|---|---|
| CN | 103824054 A | 5/2014 |
| CN | 104217214 A | 12/2014 |

OTHER PUBLICATIONS

Multimodal Deep Learning for Robust RGB-D Object Recognition Andreas Eitel, Jost Tobias Springenberg, Luciano Spinello, Martin Riedmiller, Wolfram Burgard (Submitted on Jul. 24, 2015 (v1), last revised Aug. 18, 2015 (this version, v2)):[v1] Fri, Jul. 24, 2015 12:20:19 GMT (1012kb,D) https://arxiv.org/pdf/1507.06821v2—last accessed Dec. 1, 2016.*
Bai, Jing, et al. "Subset based deep learning for RGB-D object recognition." Neurocomputing 165 (2015): 280-292.*

(Continued)

*Primary Examiner* — Bhavesh Mehta
*Assistant Examiner* — Narek Zohrabyan
(74) *Attorney, Agent, or Firm* — Jones Robb PLLC

(57) ABSTRACT

Embodiments of a computer-implemented method for training a convolutional neural network (CNN) that is pre-trained using a set of color images are disclosed. The method comprises receiving a training dataset including multiple multidimensional images, each multidimensional image including a color image and a depth image; performing a fine-tuning of the pre-trained CNN using the depth image for each of the plurality of multidimensional images; obtaining a depth CNN based on the pre-trained CNN, wherein the depth CNN is associated with a first set of parameters; replicating the depth CNN to obtain a duplicate depth CNN being initialized with the first set of parameters; and obtaining a depth-enhanced color CNN based on the duplicate depth CNN being fine-tuned using the color image for each of the plurality of multidimensional images, wherein the depth-enhanced color CNN is associated with a second set of parameters.

27 Claims, 5 Drawing Sheets

(56) References Cited

OTHER PUBLICATIONS

"3D Object Recognition using Convolutional Neural Networks with Transfer Learning between Input Channels", Luis A. Alexandre, Department of Informatics and Instituto de Telecomunicações Univ. Beira Interior, Covilhã, Portugal, luis.alexandre@ubi.pt.
R. Socher, B. Huval, B. Bhat, C.D. Manning and A.Y. Ng. Convolutional-Recursive Deep Learning for 3D Object Classification. Advances in Neural Information Processing Systems, 2012.
S. Gupta, R. Girshick, P. Arbeláez and J. Malik. Learning rich features from RGB-D images for Object detection and segmentation. Computer Vision—ECCV 2014.
RGB-D Object Recognition and Pose Estimation based on Pre-trained Convolutional Neural Network Features, Max Schwarz, Hennes Schulz, and Sven Behnke IEEE International Conference on Robotics and Automation (ICRA), Seattle, May 2015.

\* cited by examiner

CROSS-TRAINED CONVOLUTIONAL NEURAL NETWORKS USING MULTIMODAL IMAGES

TECHNICAL FIELD

The presently disclosed embodiments relate to deep machine learning and more particularly, to cross-trained convolutional neural networks (CNNs) using images from multiple modalities.

BACKGROUND

Various technologies for sensing human-object interactions, such as three-dimensional (3D) sensing technologies, have been investigated to improve performance of tasks such as object detection, object recognition, and image segmentation. For example, interactions of a healthcare professional with medicines and medical instruments during a medical procedure needs to be accurately determined to track adequate healthcare being provided to a patient. Similarly, activities of a passenger in a surveillance video may be recognized through his interactions with various objects in a transportation environment.

3D images typically include a combination of depth and color information to represent features such as edges, lines, corners, and shapes of various image objects. Color information refers to RGB (Red, Green, Blue) data for object features defined using a variety of techniques such as scale-invariant feature transform (SIFT), histograms of oriented gradients (HoG), and speeded-up robust features (SURF) interest points. Depth information provides geometrical cues or estimates about the object features relative to a viewpoint, such as from a camera. Such geometrical cues are invariant to lighting or color variations, and therefore allow better separation of object features from the background. Such 3D images having both depth and color information are also referred to as RGB-D images being an aggregation of RGB images and depth images or depth map.

Various machine learning techniques such as convolutional neural networks (CNNs) are used to recognize image objects as such techniques can automatically learn 3D image features without the features being manually designed to capture depth invariances or deformations (e.g., translation, rotation, skew, etc.). Conventionally, CNNs are employed to extract image features separately from depth and color modalities, and then combine these features later using a late fusion technique. However, as color images and depth scans are correlated to often manifest depth discontinuities as strong edges in color images, the late fusion technique causes inefficiencies while learning these correlations. Additionally, such technique lacks benefit from the other modalities present in the training data when one of the modalities is absent at test time. Further, various tasks are performed poorly in the absence of depth images during testing.

It may therefore be beneficial to provide robust systems and methods for object recognition that are independent of the object features being available for learning.

SUMMARY

One embodiment of the present disclosure includes a computer-implemented method for training a convolutional neural network (CNN) that is pre-trained using a set of color images. The method comprises receiving, using an input module of a system memory, a training dataset including a plurality of multidimensional images, each multidimensional image including a color image and a depth image; performing, using a processor, a fine-tuning of the pre-trained CNN using the depth image for each of the plurality of multidimensional images; obtaining, using the cross-trained CNN module in the system memory, a depth CNN based on the pre-trained CNN, the depth CNN includes at least one convolutional layer in communication with an ultimate fully-connected layer via a penultimate fully-connected-layer, wherein the depth CNN is associated with a first set of parameters; replicating, using the cross-trained CNN module, the depth CNN to obtain a duplicate depth CNN being initialized with the first set of parameters; and obtaining, using the cross-trained CNN module, a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer of the depth-enhanced color CNN, wherein the depth-enhanced color CNN is associated with a second set of parameters.

Another embodiment of the present disclosure includes a device for training a convolutional neural network (CNN) that is pre-trained using a set of color images. The device comprises an input module and a cross-trained CNN module. The input module receives a training dataset including a plurality of multidimensional images, each of the multidimensional images including a color image and a depth image. The cross-trained CNN module is configured to: perform a fine-tuning of the pre-trained CNN using the depth image for each of the plurality of multidimensional images; obtain a depth CNN based on the pre-trained CNN, the depth CNN includes at least one convolutional layer in communication with an ultimate fully-connected layer via a penultimate fully-connected-layer, wherein the depth CNN is associated with a first set of parameters; replicate the depth CNN to obtain a duplicate depth CNN being initialized with the first set of parameters; and obtain a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer the depth-enhanced color CNN, wherein the depth-enhanced color CNN is associated with a second set of parameters.

Yet another embodiment of the present disclosure includes a non-transitory computer-readable medium comprising computer-executable instructions for training a convolutional neural network (CNN) that is pre-trained using a set of color images, the non-transitory computer-readable medium comprising instructions for: receiving a training dataset including a plurality of multidimensional images, each multidimensional image including a color image and a depth image; performing, using a processor, a fine-tuning of the pre-trained CNN using the depth image for each of the plurality of multidimensional images; obtaining a depth CNN based on the pre-trained CNN, the depth CNN includes at least one convolutional layer in communication with an ultimate fully-connected layer via a penultimate fully-connected-layer, wherein the depth CNN is associated with a first set of parameters; replicating the depth CNN to obtain a duplicate depth CNN being initialized with the first set of parameters; and obtaining a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer of the depth-enhanced color CNN, wherein the depth-enhanced color CNN is associated with a second set of parameters.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
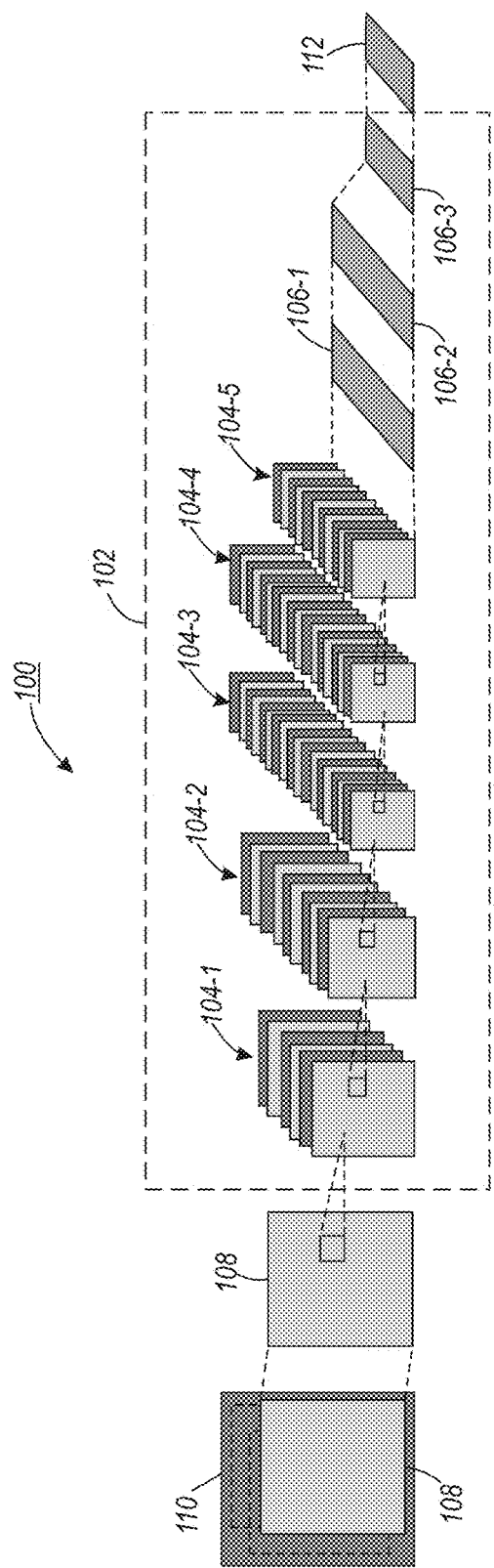
FIG. 1 is a schematic for training a convolutional neural network using a set of color images according to an embodiment of the present disclosure.

The following detailed description is made with reference to the figures. Some of the embodiments are described to illustrate the disclosure, not to limit its scope, which is defined by the claims. Those of ordinary skill in the art will recognize a number of equivalent variations in the description that follows.

Non-Limiting Definitions

A "task" is used in the present disclosure in the context of its broadest definition. The task may refer to an operation to be performed on a dataset. The task may be related to computer vision applications such as object recognition, image classification, and so on.

A "training dataset" is used in the present disclosure in the context of its broadest definition. The training dataset may refer to a collection of one or more multidimensional images such as RGB-D images, each having a color image such as an RGB image and a depth image.

A "feature" or "feature vector" is used in the present disclosure in the context of its broadest definition. The feature may refer to aspects of an entity such as a person or an object, in an image or video frame. Examples of the property may include dimensions in the image (e.g., 2-dimensional, 3-dimensional, etc.), number of persons, shape of the object, and so on.

A "model" is used in the present disclosure in the context of its broadest definition. The model may refer to a framework, architecture, a mathematical representation, and so on, defined for the task involving one or more parameters related to one or more features.

A "training workflow" is used in the present disclosure in the context of its broadest definition. The training workflow may refer to steps involved in training a deep neural network such as a convolutional neural network for performing various tasks on the training dataset.

A "receptive field" is used in the present disclosure in the context of its broadest definition. The receptive field may refer to a region in an image providing a predetermined number of pixel values as input to a neuron in artificial neural networks such as a convolutional neural network.

A "stride" is used in the present disclosure in the context of its broadest definition. The stride may refer to a distance between receptive field centers of neighboring neurons within a feature map in artificial neural networks such as a convolutional neural network.

"Feature validation accuracy" is used in the present disclosure in the context of its broadest definition. The feature validation accuracy may refer to a fraction of correctly labeled features of an input image such as a color image or a depth image in the training dataset.

A "Channel" is used in the present disclosure in the context of its broadest definition. The channel may refer to a stream of uncompressed image samples of a predetermined size (e.g., 8 bits) or type (e.g., red images).

Overview

Embodiments are disclosed to provide cross-trained convolutional neural networks for object recognition in multidimensional images such as RGB-D images having color images such as RGB images and depth images. During training, a pre-trained convolutional neural network (CNN) may be fine-tuned using depth images to obtain a depth feature extractor or depth CNN having predetermined number of convolutional layers and fully-connected layers. The activations of the penultimate fully-connected layer may be extracted as depth features for the depth images. Subsequently, a copy of the depth CNN may be fine-tuned with the color images such as the RGB images to provide a color feature extractor or a depth-enhanced color CNN, which is being pre-trained using depth images. Such pre-training of the depth-enhanced color CNN allows introducing a useful prior based on depth information. The fine-tuned parameters of the depth-enhanced color CNN are restricted to regions that capture some depth information. Similar to depth features, activations of the penultimate fully-connected layer of the depth-enhanced color CNN are used as color features. During testing, if both color and depth modalities are present, the color and depth features may be extracted and concatenated to obtain a final set of combined feature vectors to perform a predefined task such as object recognition and image classification. However when the depth modality is unavailable during testing, the depth-enhanced color feature extractor may be used to extract the image features. Thus, the depth-enhanced color feature extractor allows utilizing the depth information present in the training dataset during testing or real-world applications to improve task performance.

Exemplary Embodiments

FIG. 1 is a schematic for training a convolutional neural network using a set of color images according to an embodiment of the present disclosure. An embodiment of a convolutional neural network 100 (CNN 100) includes multiple trainable stages or layers stacked on top of each other, each layer learning hierarchies of features obtained directly from input data. In one example, the CNN 100 has eight learning layers 102 including five convolutional layers 104-1, 104-2, . . . , 104-5 (collectively, convolutional layers 104) and three fully-connected layers 106-1, 106-2, 106-3 (collectively, fully-connected layers 106). The convolutional layers 104 can be operationally or logically connected to one another, and the fully-connected layers 106 can be operationally or logically connected to one another. The number of layers is exemplary, and other embodiments for the CNN can include greater or fewer than eight layers. The number of learning layers 102 being implemented can depend on factors such as (1) the amount of memory available for use by operating processor(s), and (2) the amount of training time being allowed or desirable. The learning layers 102 extract image features (e.g., edges, corners, lines, etc.) from an input image 108, which may be a color image such as an RGB (Red, Green, Blue) image from a set of high resolution color images 110, hereinafter referred to as image dataset 110. In one example, the image dataset 110 may be a subset of an image database such as, but not limited to, ImageNet or a similar commercial or private image database, which is a dataset of a large number of labeled high-resolution images. The image dataset 110 may include any number of categories of classes. In one non-limiting example, the image dataset may have 1000 categories or classes, each having 1000 images, which are tagged with a class label referring to a particular class. Since the image dataset 110 may include variable-resolution images, each RGB image fed as the input image 108 to the CNN 100 may be down-sampled to a fixed resolution, for example, 224×224 pixels. Since the RGB image has three image channels of red (R) images, green (G) images, and blue (B) images, each with a resolution of 224×224 pixels, such RGB image has a size of [224×224×3].

For each convolutional layer 104, a set of parameters (e.g., filter weights, biases, etc.) are randomly initialized in the form of a matrix. For example, the first convolutional layer 104-1 may have a filter weight, hereinafter also referred to as filter, neuron weight, or kernel, of size [55×55]. The kernel may be slid across the width and height of the input image 108 to convolve the filter weights with input values and subjected to a bias (or threshold) for each pixel in the input image 108. The input values refer to brightness intensities for the pixels in the input image 108.

Each such convolution represents a neuron that looks at only a small region in the input image 108 based on the applied kernel. In other words, each neuron receives input from only a small number of neurons. The number of neurons outputted from the first convolutional layer 104-1 depends on the depth of the applied kernel (i.e., the number of times the kernel is applied) on the input image 108. For example, the first convolutional layer 104-1 filters the [224×224×3] input image with depth of 96 for a kernel of size [11×11×3] having a stride of 4 pixels to output [55×55×96] neurons, which are applied to the next learning layer. The second convolutional layer 104-2 takes as input the output of the first convolutional layer 104-1 and filters it with 256 kernels of size [5×5×96]. The third convolutional layer 104-3, the fourth convolutional layer 104-4, and fifth convolutional layer 104-5 are operationally or logically connected to one another. The third convolutional layer 104-3 has 384 kernels of size [3×3×256] connected to the (normalized, pooled) outputs of the second convolutional layer 104-2. The fourth convolutional layer 104-4 has 384 kernels of size [3×3×384], and the fifth convolutional layer 104-5 has 256 kernels of size [3×3×384]. The fully-connected layers 106 have 4096 neurons each.

Each of the learning layers 102 up to the penultimate fully-connected layer such as the fully-connected layer 106-2 outputs neurons including a set of convolutions for different small regions of the previous layer (e.g., a selected small region of the input image 108) based on the respective initialized set of parameters (e.g., filter weights, biases, etc.). Such outputted neurons are grouped into feature maps, which may be pooled to achieve spatial invariance by reducing the resolution of feature maps, and therefore reduce computational time. For example, each of the convolutional layers 104-1, 104-2, and 104-5 can be combined with a pooling layer that pools the feature maps using one of many available algorithms such as max pooling, sub-sampling, spatial pyramid pooling, and so on.

Neurons in the same feature map can share a same set of parameters (e.g., filter weights, biases, learning rates, etc.). Additionally, the neurons in the same feature map can be connected to different (often overlapping) regions of the input image 108 (or neurons) through the previous learning layer. Therefore, each feature map can detect a distinct feature in the input image 108, such that each neuron of the feature map looks for the same feature but at different locations in the input image 108. Such feature maps may be represented in 2D (2-dimensional) matrix where the neurons are arranged according to the spatial closeness of their receptive fields. Hence, each learning layer of the CNN 100 includes multiple feature maps that are activated using an activation function (e.g., rectified linear unit (ReLu), sigmoid, tanh, etc.) to provide filtered responses to the next learning layer.

During such forward propagation in the CNN 100, an activation of each neuron in a feature map is the sum of convolution of the kernel of that feature map with the feature maps of the previous learning layer. Mathematically, such neuron activations may be represented as shown in equation 1.

$$y_j = f\left(\sum_i k_{ij} * x_i\right) \quad (1)$$

In equation 1, $y_j$ is the $j^{th}$ feature map, $k_{ij}$ is the convolutional kernel of the $j^{th}$ feature map for the $i^{th}$ feature map of the previous layer (or input image channel), $x_i$ is the $i^{th}$ feature map of the previous layer (or the $i^{th}$ image channel) and 'f' is the activation function.

The fully-connected layers 106 can allow the CNN 100 to learn distributed feature representations. In contrast to the convolutional layers 104, in which each neuron in one convolutional layer 104 is connected to a neuron in a previous learning layer, each fully-connected layer 106 has neurons connected to every neuron in the previous layer. In other words, the neurons have full connections to all activations in the previous learning layer. These activations may be computed using any of the activation functions as discussed herein based on the initialized set of parameters (e.g., filter weights, biases, etc.) in each fully-connected layer up to the penultimate fully-connected layer 106, such as the fully-connected layer 106-2.

The ultimate or final fully-connected layer, such as the fully-connected layer 106-3, can hold the final output of the learning layers 102 based on matrix multiplication in the previous layer. The final output is represented as a real-valued matrix having the activations of only a predetermined number of 'N' neurons. The fully-connected layer can be randomly initialized to set the value N (such as the value of 1000), based on factors such as (1) image categories or classes of the training dataset, or (2) a number of processing functions of a classifier 112 attached to the fully-connected layer 106-3. In other words, the ultimate fully-connected layer 106-3 may discard some neurons from the penultimate fully-connected layer 106-2 based on the set value of N, thereby improving computational time.

The CNN 100 (that is undergoing training using color images) may be used for various tasks such as image classification. The image feature derived as an output of the ultimate fully-connected layer 106-3 can be provided to the classifier 112 configured for such a predetermined task. The classifier 112 can classify the image feature into a class label corresponding to the image dataset 110 based on available techniques such as gradient check using various parameters (e.g., learning rate, momentum, etc.) and can determine the classification error. Based on the determined error, the CNN 100 can adjust the set of initialized parameters (e.g., filter weights, biases, etc.) of the convolutional layers 104 and the fully-connected layers 106 by applying backpropagation based on any of the available techniques, such as gradient descent. The adjusted set of parameters (e.g., filter weights, biases, etc.) allows the classifier 112 to become trained to identify the input image 108. Similarly, the classifier 112, and in turn the CNN 100, can be trained over the entire training dataset 110, as discussed above, to determine a first set of parameters (e.g., filter weights, biases, etc.) for the learning layers 102 of the CNN 100. Examples of the classifier 112 include, but are not limited to, Softmax and Support Vector Machine (SVM).

Figure 2:
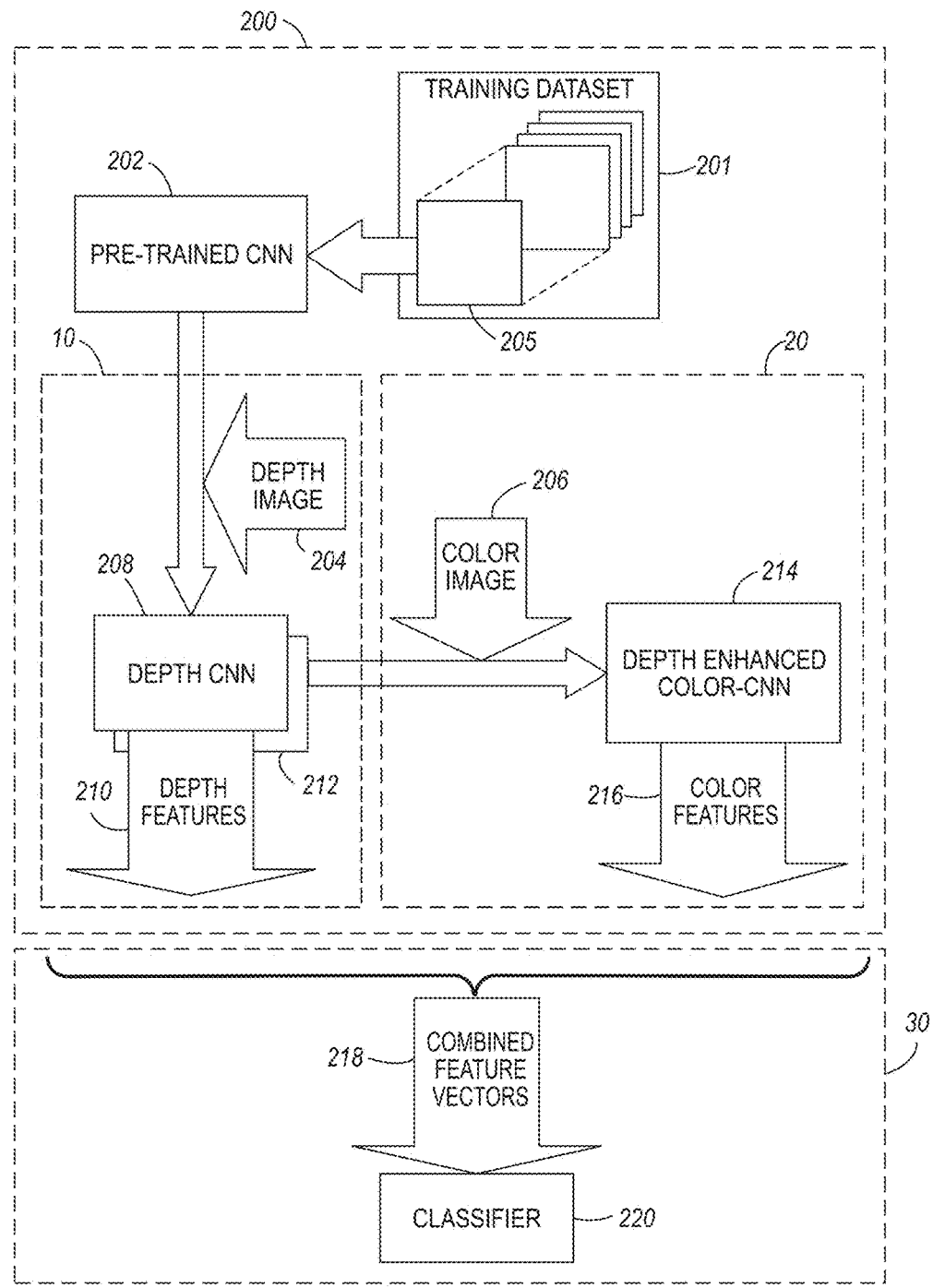
FIG. 2 is a schematic that illustrates an exemplary workflow for training a pre-trained CNN of FIG. 1, according to an embodiment of the present disclosure.

FIG. 2 is a schematic that illustrates an exemplary workflow for training a pre-trained CNN, according to an embodiment of the present disclosure. Embodiments are disclosed in the context of training a pre-trained CNN; however, the disclosed embodiments can be subsequently or simultaneously implemented in test or real-world scenarios. Examples of such real-world scenarios can include, but are not limited to, retail checkouts, driver monitoring systems, agent behavior recognition in a call center environment, healthcare monitoring during medical procedures, gaming systems, virtual reality augmentation, and so on.

The training workflow 200 may include the use of a pre-trained CNN 202 that can include multiple learning layers, such as the convolutional layers 104 and the fully-connected layers 106. In one example, the CNN 202 may be pre-trained using a large, diverse dataset of color images, such as ImageNet, using stochastic gradient descent with back-propagation, as discussed in the description of FIG. 1. Such pre-training guides the learning of image features towards basins of attraction of minima that support better generalization of the image features, and implicitly imposes constraints (e.g., allowed minima of the cost function in the classifier such as the classifier 112) on the CNN parameters (e.g., filter weights, biases, etc.). The pre-trained CNN 202 may be initialized with the first set of parameters (e.g., filter weights, biases, etc.) based on being pre-trained using color images such as RGB images, as discussed above.

In one embodiment, the pre-trained CNN 202 may be trained using multimodal images such as multidimensional images having color and depth information to improve performance of tasks related to computer vision. The multidimensional images may be applied as a training dataset 201 to the pre-trained CNN 202. In a non-limiting example, the training dataset may have a total of 207,920 RGB-D images that can be classified into 51 different classes of household objects with 300 instances of these classes. Each object instance may be imaged from three different angles, resulting in about 600 images per instance. Other examples can vary according to the training dataset size, classifications, number of angles of imaging, etc.

These multidimensional images may be segregated into depth images 204 and color images 206, such as RGB images. The RGB images include R, G, and B image channels, providing respective R, G, and B images that can be represented as 2D matrices of pixel values indicating brightness intensities from a predetermined range based on the image size. For example, in a 24-bit RGB image having 8 bits for each of the R, G, and B images, every discrete pixel value in an R, G, or B image may represent brightness intensity by a value from range 0 and 255. Based on the R, G, and B image channels, the matrix size may increase three times as discussed in the description of FIG. 1. Further, a person having ordinary skill in the art will understand that the color images 206 may be represented in any of a variety of color models known in the art, related art, or developed later including CMYK (Cyan, Magenta, Yellow, Key or Black) and HSV (Hue, Saturation, Value) color models.

The depth images 204 may include multiple blended views of a scene to render a hole-free scene. Each depth image 204 can include a single image channel representing depth of each image pixel as the distance along a principle axis, for example, z-axis, from a viewpoint (e.g., a camera center) to a preset 3D (3-dimensional) point that projects to that pixel. Such distance or depth values may be represented as a 2D matrix of per-pixel depth in centimeters or millimeters. In some embodiments, such depth images 204 may be constructed for 2D images based on a variety of image aspects (e.g., depth from stereo viewpoints, shape from focus, shape from defocus, structure from motion, shape from silhouettes, shape from shading, etc.) based on one of various methods known in the art, related art, or developed later, for example, a triangulation method, a volumetric merging method, and so on, using various color-depth sensors such as Microsoft Kinect, LIDAR, etc.

In some embodiments, the depth images 204 may be encoded with three distinct channels at each image pixel. These channels include horizontal disparity (H), height above ground (H), and the angle the pixel's local surface normal makes with the inferred gravity direction (A). Such HHA representation of depth images 204 encodes properties of geocentric pose that emphasize complementary discontinuities (e.g., depth, surface normal, and height) in the depth images 204. The HHA representation involves the depth image 204 being first pre-processed to fill-in missing depth values using a variety of techniques known in the art, related art, or developed later. The encoding of the depth images can be followed by estimation of surface normals at each pixel location using camera intrinsic parameters such as the focal length of the camera and the coordinates of the optical center of the lens. Further, the direction of gravity may be computed by iteratively determining a direction, which is maximally aligned to, or orthogonal to, locally estimated surface normals at as many points as possible on the images. Using the determined direction of gravity, the height above ground and the angle of gravity may be then computed. One having ordinary skill in the art will understand that the depth images may be represented in a variety of other representations known in the art, related art, or developed later.

The pre-trained CNN 202 may be fine-tuned using the obtained color images 206 and the depth images 204 in multiple phases using a variety of methods known in the art, related art, or developed later including, but not limited to, mini-batch gradient descent with predetermined value of parameters (e.g., momentum of 0.9) and batch size (e.g., 200 images). Such fine-tuning can be advantageous to retain the useful low-level feature extractors (e.g., convolutional layers 104) learnt earlier by the pre-trained CNN 202 while at the same time updates the higher learning layers, such as the fully-connected layers 106, making them more discriminative for a new task. In other words, the lower learning layers provide more generic features (e.g., edges, etc.) and the higher learning layers use these generic features to represent more discriminative templates of features (e.g., face, instruments, vehicle, structure, etc.).

As illustrated in FIG. 2, in a first phase 10, the pre-trained CNN 202 may be fine-tuned using the obtained depth images 204. Similar to the input image 108, each depth image may be applied as an input image 205 via multiple channels to the pre-trained CNN 202. However since the depth image 204 has a single channel, unlike the three R, G, and B image channels in an RGB image, each depth image 204 may be replicated on three input channels. For example, a depth image represented as [255×255] matrix of depth values upon being replicated on three input channels may have a size of [255×255×3]. Such augmented depth images 204 having increased sizes may be applied as input images 205 to the pre-trained CNN 202, which may process them based on the first set of parameters (e.g., filter weights, biases, etc.) predetermined for one or more learning layers, as discussed in the description of FIG. 1. In some embodiments, the depth images 204 may be encoded to include three input channels corresponding to the horizontal disparity, the height above ground, and the angle the pixel's local surface normal makes with the inferred gravity direction for each image pixel.

In one embodiment, the pre-trained CNN 202 can be configured to operate as a fixed feature extractor by removing the ultimate fully-connected layer, such as the fully-connected layer 106-3, which may be specific to a pre-training task. The ultimate fully-connected layer is replaced with a new randomly initialized fully-connected layer with the desired number of output units or neurons. For example, the last fully-connected layer 106-3 having 1000 output neurons may be replaced with a new fully-connected layer being randomly initialized with 51 neurons using a Gaussian distribution with a predetermined mean, for example, zero, and standard deviation, for example, $10^{-2}$. This new ultimate fully-connected layer may be trained with a higher learning rate as compared to the lower layers to prevent clobbering the initialization of the pre-trained CNN 202. In a non-limiting example, the learning rate may be set to 0.01 for the weights and 0.02 for the biases in the ultimate fully-connected layer 106-3. In the example above, for the fully-connected layer 106-1 and fully-connected layer 106-2, the learning rate may be initialized to 0.002 and 0.004 for the weights and biases, respectively. For all other layers such as the convolutional layers 104, the learning rate may be initialized at 0.001 and 0.002 for the weights and biases, respectively. In the embodiments, learning rates may be adjusted by various factors, for example, by a factor of 10 for all weights and biases based on the observed feature validation accuracy as determined by the classifier 112, either manually or automatically during training.

The pre-trained CNN 202 that can be fine-tuned using the depth images 204, can provide a depth CNN 208, which provides activations of the penultimate fully-connected layer, such as the fully-connected layer 106-2, as depth features 210 having predetermined dimensions, for example, 4096-dimensional or 4096 neurons, based on the pre-trained CNN 202 being used.

Further in a second phase 20, a copy 212 of the depth CNN 208 (hereinafter referred to as duplicate depth CNN 212) can be utilized that can include a second set of parameters (e.g., filter weights, biases, etc.) based on being trained with the depth images 204. The duplicate depth CNN 212 may be fine-tuned by the obtained color images 206 in a manner similar to the fine-tuning of the pre-trained CNN 202 using depth images 204, as discussed above. Upon being fine-tuned with color images 206, the duplicate depth CNN 212 generates a depth-enhanced color CNN 214, such a depth-enhanced RGB CNN, which operates as a color feature extractor, such as an RGB feature extractor, which has been pre-trained using the depth images 204. Similar to the depth features 210, the activations of the penultimate fully-connected layer, such as the fully-connected layer 106-2, of the depth-enhanced color CNN can be used as color features 216 such as RGB features. In other words, the depth-enhanced color CNN 214 allows combining color and depth information at an early stage such as at the learning layers, such as the learning layers 102, of the depth-enhanced color CNN 214 obtaining the benefit from the depth information.

The generated depth CNN 208 and the depth-enhanced color CNN 214 can be used to perform various vision tasks such as object recognition. For example, during a testing workflow 30, depth features (e.g., the depth features 210) from the depth CNN 208 and color features (e.g., the color features 216), such as the RGB features from the depth-enhanced color CNN 214, may be concatenated at a classification layer (not shown) to produce combined feature vectors 218, which may be used to train one of a variety of classifiers, such as a classifier 220, known in the art, related art, or developed later including Softmax and SVM over the entire set of RGB-D images.

In contrast to traditional early fusion techniques involving the use of depth modality as a fourth input channel of a CNN, the training workflow 200 advantageously allows the utilization of CNNs that can be pre-trained on large image datasets, such as ImageNet, including color images such as RGB images that only have three input channels. The training workflow 200 can also leverage extra modalities, for example, depth modality, in the training dataset 201 through the depth-enhanced color CNN 214 even when such modality is unavailable from a testing dataset. The depth-enhanced color CNN 214 advantageously allows learning the correlations between depth and color modalities, as well as leads to increased object recognition accuracy, even when only one of those modalities is present during testing.

Figure 3:
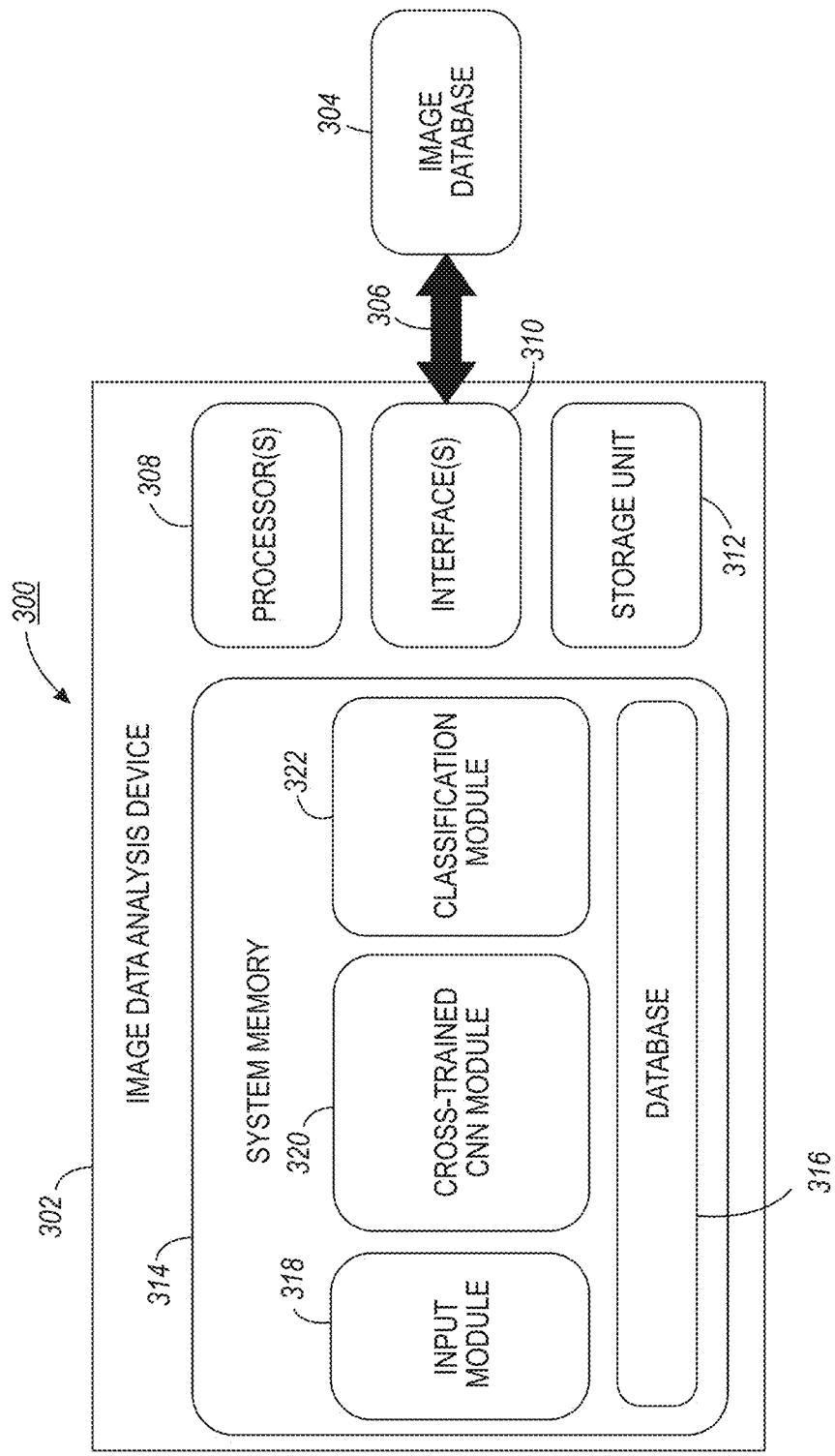
FIG. 3 is a schematic that illustrates a computing environment including an exemplary image data analysis device implementing the training workflow of FIG. 2, according to an embodiment of the present disclosure.

FIG. 3 is a schematic that illustrates a computing environment including an exemplary image data analysis device 302 that can implement the training workflow of FIG. 2, according to an embodiment of the present disclosure. The computing environment 300 includes an image data analysis device 302 communicating with an image database 304 over a network 306, which may include any software, hardware, or computer applications that can provide a medium to exchange signals, such as signals corresponding to images in one or more formats. Communication network 306 may include, but is not limited to, social media platforms implemented as a website, a unified communication application, or a standalone application such as a chat program. Examples of the social media platforms may include, but are not limited to, Twitter™, Facebook™, Skype™, Microsoft Lync™, Cisco Webex™, Flickr™, YouTube™, and Google Hangouts™. Further, the network 306 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. Network 306 may include multiple networks or sub-networks, each of which may include, for example, a wired or wireless data pathway. The network 306 may include a circuit-switched voice network, a packet-switched data network, or any other network able to carry electronic communications. For example, the network 306 may include networks based on the Internet protocol (IP) or asynchronous transfer mode (ATM), and may support voice, video, and data communications.

The image database 304 can be a repository of videos or images, which may be partially or wholly communicated as a training dataset 201 to the image data analysis device 302 for machine learning. The database 304 may be located within system memory 314 or separated by physical distances. Embodiments of the training dataset 201 may include a plurality of color images such as RGB-D images (e.g., 3D images), having both RGB and depth values for each image pixel. The training dataset 201 may be organized in a variety of ways known in the art, related art, or developed later including hierarchical arrangement involving multiple nodes connected to each other. Each node (not shown) may represent an image class that may relate to a category that may be user-defined or based on various image attributes such as image name, image file type (e.g., JPG, GIF, PNG, etc.), image size, image resolution, object views (e.g., 2D views, 3D views, perspective views, sliced views, top views, etc.), image color model (e.g., RGB, CMY, HSL, etc.), image color palette (monochromatic, polychromatic, etc.), and so on. In some instances, the training dataset 201 may include metadata, and unstructured network and server data based on the training dataset 201 being received over the network 306 by the image data analysis device 302.

The image data analysis device 302 may be implemented by way of a single device (e.g., a computing device, a processor or an electronic storage device) or a combination of multiple devices that are operatively or logically connected or networked together. The image data analysis device 302 may be implemented in hardware or a suitable combination of hardware and software. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications and/or on one or more processors.

In the embodiment, the image data analysis device 302 may be a hardware device including a processor(s) 308, an interface(s) 310, a storage unit 312, and a system memory 314. The processor(s) 308 may include, for example, microprocessors, microcomputers, microcontrollers, digital signal processors, central processing units (CPUs), graphics processing units (GPUs), state machines, logic circuits, and/or any devices that manipulate signals based on operational machine readable program instructions for analyzing still images or video frames. Among other capabilities, the processor(s) 308 may be configured to fetch and execute computer readable instructions in the system memory 314 or the storage unit 312 associated with the image data analysis device 302 for performing tasks such as signal coding, data processing input/output processing, power control, and/or other preconfigured or dynamically configured functions. For example, the storage unit 312 may store software instructions for implementing predetermined set of parameters for training a neural network, such as the pre-trained CNN 202, the depth CNN 208, and the depth-enhanced color CNN 214 as discussed above.

In some embodiments, the image data analysis device 302 may include, in whole or in part, a software application working alone or in conjunction with one or more hardware resources. Such software applications may be executed by the processor(s) 308 on different hardware platforms or emulated in a virtual environment. Aspects of the image data analysis device 302 may leverage known, related art, or later developed off-the-shelf software. Other embodiments may comprise the image data analysis device 302 being integrated or in communication with a mobile switching center, network gateway system, Internet access node, application server, IMS core, service node, or some other communication systems, including any combination thereof. In some embodiments, the image data analysis device 302 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

Interface(s) 310 may include a variety of known, related art, or later developed interface(s) 310, including software interfaces (e.g., an application programming interface, a graphical user interface, etc.); hardware interfaces (e.g., cable connectors, a keyboard, a card reader, a barcode reader, a biometric scanner, an interactive display screen, etc.); or both. In one embodiment, the interface(s) 310 may assist to receive the training dataset 201 from the image database 304, a testing dataset including multidimensional images; various predetermined parameters such as the first set of parameters to implement the pre-trained CNN 202 from a networked device or a user.

Further, the storage unit 312 may comprise any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. In some instances, the storage unit 312 may be a data storage space in a different computing device in communication with the image data analysis device 302. The storage unit 312 may be configured to store at least one of (1) the received training dataset 201 including multidimensional images such as RGB-D images; (2) color images 206 such as RGB images and depth images 204, for example, obtained upon segregating the multidimensional images such as the RGB-D images; (3) training dataset-related information (e.g., class labels, truth tables, image instances, class categories, image size, image format, creation date, associated tags or labels, etc.); (4) a log of profiles of networked devices and associated communications including instructions, queries, conversations, data, and related metadata.

The system memory 314 may be configured to store data that is being relatively frequently used. In one embodiment, the system memory 314 may store at least one of (1) a variety of parameters (e.g., filter weights, biases, learning rates, momentum, etc.) received or determined for implementing the different types of CNNs such as the pre-trained CNN 202, the depth CNN 208, and the depth-enhanced color CNN 214 and (2) predefined mathematical models, equations, algorithms, etc., for implementing a convolutional neural network. Similar to the storage unit 312, the system memory 314 may comprise of any computer-readable medium known in the art, related art, or developed later.

The system memory 314 may include one or more databases such as a database 316, which may be sub-divided into further databases for storing electronic files or data. The database 316 may have one of many database schemas known in the art, related art, or developed later for storing image or other processing data using the image data analysis device 302. For example, the database 316 may have a relational database schema involving a primary key attribute and one or more secondary attributes. In some embodiments, the image data analysis device 302 may perform one or more operations, but not limited to, reading, writing, indexing, labeling, updating, and modifying the data, and may communicate with various networked computing devices. The database 316 may store values of one or more parameters (e.g., filter weights, biases, learning rates, momentum, etc.) determined for implementing the pre-trained CNN 202, the depth CNN 208, and the depth-enhanced color CNN 214. In some embodiments, the storage unit 312 and the database 316 may be integrated.

The system memory 314 may include various modules such as an input module 318, a cross-trained CNN module 320, and a classification module 322. The input module 318 may be configured to collect or receive signals corresponding to image-related data as a training dataset 201 from one or more sources such as the image database 304 via the interface(s) 310 over the network 306. In one embodiment, the training dataset 201 may include multidimensional images such as the RGB-D images as raw data that may be converted into appropriate formats for use by the image data analysis device 302 using hardware or software modules, or both, controlled by the processor(s) 308 so that the converted images can be received or processed by the input module 318. For example, each of the RGB-D images may be segregated by the input module 318 into a depth image and an RGB image, which may be then stored in the storage unit 312. Additionally, the input module 318 may receive signals that represent values of various parameters or aspects defining a CNN that is being pre-trained using RGB images corresponding to the training dataset 201. Examples of such parameters include, but are not limited to, filter weights, biases or thresholds, learning rates, momentum, and so on. Such parameter values for the pre-trained CNN 202 may be stored in the database 316 by the input module 318.

The cross-trained CNN module 320 may provide one or more feature extractors by implementing the training workflow 200 discussed above to improve performance of tasks, such as those related to computer vision (e.g., object recognition, object detection, image classification, etc.) on the training dataset 201. In one embodiment, the cross-trained CNN module 320 may retrieve (1) the color images 206 and depth images 204 obtained upon segregating the RGB-D images from the storage unit 312; and (2) algorithms as well as various parameters (e.g., filter weights, biases, etc.) for implementing CNNs. For example, the cross-trained CNN module 320 may implement a pre-trained CNN 202 using predetermined first set of parameters (e.g., filter weights, biases, etc.) for each of its learning layers such as the learning layers 102. The pre-trained CNN 202 may be cross-trained across the RGB and depth modalities from the training dataset 201 by the cross-trained CNN module 320 in a predetermined number of phases. For example, in a first phase 10, the cross-trained CNN module 320 may fine-tune the pre-trained CNN 202 using the obtained depth images 204 for the RGB-D images in the training dataset 201. The pre-trained CNN 202 can be initialized with a first set of parameters predetermined based on being trained over a diversified set of color images 206 such as ImageNet. Such pre-trained CNN 202 being fine-tuned using depth images 204 may be referred to as the depth CNN 208 having a second set of parameters (e.g., filter weights, biases, etc.). The depth CNN 208 operates as a feature extractor to provide depth features 210 extracted as activations of the penultimate fully-connected layer, such as the fully-connected layer 106-2, of the depth CNN 208. The cross-trained CNN module 320 may additionally replicate the depth CNN 208 for specific use in further steps. For example, the cross-trained CNN module 320 may use a replica of the depth CNN or the duplicate depth CNN 212 for further fine-tuning.

In a second phase 20, the duplicate depth CNN 212 may be fine-tuned using the obtained RGB images from the RGB-D images in the training dataset 201. The duplicate depth CNN 212 may be initialized with the second set of parameters (e.g., filter weights, biases, etc.) and upon being fine-tuned using the obtained color images 206 such as RGB images may be referred to as the depth-enhanced RGB CNN having a third set of parameters (e.g., filter weights, biases, etc.). The depth-enhanced RGB CNN may operate as a feature extractor to provide color features 216 such as RGB features extracted as activations of the penultimate fully-connected layer, such as the fully-connected layer 106-2, of the depth-enhanced RGB CNN. In some embodiments, the cross-trained CNN module 320 may store the second set of parameters and third set of parameters in the database 316 for later use.

The depth CNN 208 and the depth-enhanced CNN 214 may be used to implement various tasks such as object recognition. In order to perform such tasks, the classification module 322 may receive a testing dataset including still images or video frames via the interface(s) 310 using a variety of color-depth sensors such as those implemented by 3D scanning devices or 2D imaging devices (e.g., color camera) known in the art, related art, or developed later. In some embodiments, the testing dataset may include multidimensional images such as RGB-D images having depth images and color images such as RGB images. The classification module 322 may use the depth CNN 208, which initializes using the second set of parameters, and the depth-enhanced color CNN 214, which initializes using the third set of parameters, to extract depth features and color features such as RGB features respectively from the testing dataset, as discussed above. In some embodiments, when depth images are unavailable in the testing dataset, the classification module 322 may use the depth-enhanced color CNN 214 to extract only the color features such as RGB features.

The classification module 322 may concatenate a pair of the extracted depth feature and the color feature such as the RGB feature for each of the RGB-D images to generate a combined feature vector, which may be classified into one of the predetermined image categories in order to recognize images in a testing dataset. The classification module 322 may implement any of the various classifiers known in the art, related art, or developed later including Support Vector Machine (SVM) and Softmax for such feature classification. The classifier 220 may then compare the classified feature against a reference dataset to verify the feature validation accuracy using a variety of techniques, known in the art, related art, or developed later. In one embodiment, the classifier 220 may be configured to compute error over the expected classification based on the comparison and determine gradient descent of a corresponding error function. The classification module 322 may accordingly modify the parameter values of the depth-enhanced color CNN 214 according to predefined criteria. For example, the classification module 322 may decrease the learning rate or increase the bias by a predefined number in the learning layers, such as the learning layers 102, of the depth-enhanced color CNN 214 if the error percentage is above a predefined threshold percentage. For instance, the learning rate may be decreased by 0.01 if the error percentage is above 40%. This process of modifying the parameter values based on descent in the error gradient, a process termed backpropagation, may be implemented in order to train the image data analysis device 302 in a supervised learning fashion.

Figure 4:
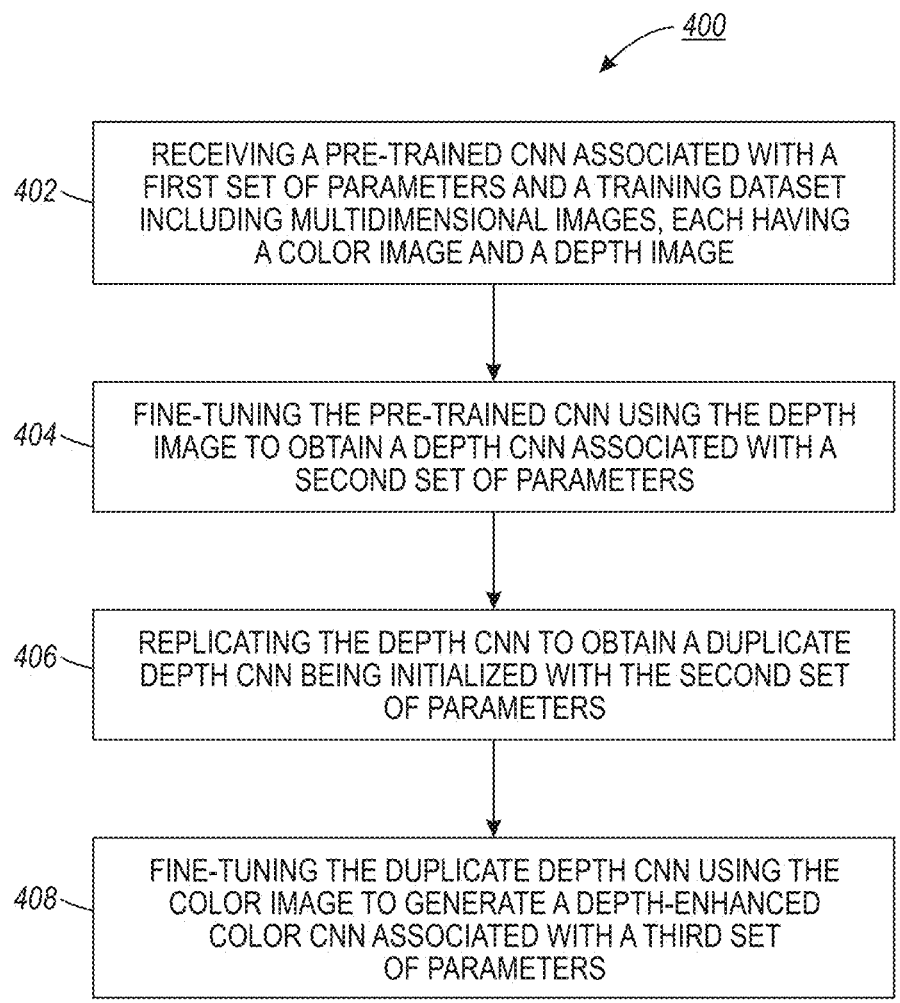
FIG. 4 is a flowchart illustrating an exemplary method for implementing the training workflow of FIG. 2, according to an embodiment of the present disclosure.

FIG. 4 is a flowchart illustrating an exemplary method for implementing the training workflow 200 of FIG. 2, according to an embodiment of the present disclosure. The exemplary method 400 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 400 is described is not intended to be construed as a limitation, and any number of the described method blocks may be combined or otherwise performed in any order to implement the method, or an alternate method. Additionally, individual blocks may be deleted from the method without departing from the spirit and scope of the present disclosure described herein. Furthermore, the method 300 may be implemented in any suitable hardware, software, firmware, or combination thereof, that exists in the related art or that is later developed.

The method 400 describes, without limitation, implementation of the exemplary training workflow 200. One of skill in the art will understand that the method 400 may be modified appropriately for implementation in a various manners without departing from the scope and spirit of the disclosure.

At step 402, a pre-trained CNN 202 and a training dataset 201 including multidimensional images having color and depth information can be received. The image data analysis device 302 may operate in communication with the image database 304 to receive the training dataset 201 including a labeled set of multidimensional images such as RGB-D images belonging to a predetermined number of categories or classes. Additionally, the image data analysis device 302 may receive a predetermined first set of parameters from the networked computing devices or a user via interface(s) 310 over the network 306 for implementing a pre-trained CNN 202. The first set of parameters may be learned by training a conventional CNN using a diverse set of color images such as RGB images. The input module 318 of the image data analysis device 302 may use the received first set of parameters to implement the pre-trained CNN 202. The first set of parameters and the training dataset 201 may be stored in the database 316 and the storage unit 312, respectively.

In the embodiment, the input module 318 may segregate each of the multidimensional images, such as the RGB-D images, into a color image such as an RGB image and a depth image. The color image may be represented in any of the color models known in the art, related art, or developed later. In some embodiments, the depth image may be encoded in different representations such as the HHA representation, as discussed above. The segregated color image and the depth image may be stored in the storage unit 312. Further, the input module 318 may retrieve a variety of models, equations, algorithms, etc., known in the art, related art, or developed later, and the first set of parameters (e.g., filter weights, biases, etc.) from the database 316 to implement a pre-trained CNN such as the pre-trained CNN 202.

At step 404, the pre-trained CNN can be fine-tuned using the depth image to obtain a depth CNN. In the image data analysis device 302, the cross-trained CNN module 320 may fine-tune the pre-trained CNN 202, which can be initialized with the first set of parameters (e.g., filter weights, biases, etc.) for one or more of its learning layers, using the depth image. Since a depth image has a single channel, unlike the three R, G, and B image channels in an RGB image, each depth image may be replicated on three input channels applied to the pre-trained CNN 202. Additionally, for such fine-tuning, the ultimate fully-connected layer, such as the fully-connected layer 106-3, may be replaced with a new fully-connected layer as the existing fully-connected layer is specific to pre-training task and may be initialized based on the class categories in the pre-training input dataset used for the pre-trained CNN 202. The new fully-connected layer may be randomly initialized based on the class categories of the received training dataset 201 including the multidimensional images such as the RGB-D images. Across different learning layers, the depth image represented as a matrix of depth values undergoes matrix multiplication with the first set of parameters respective to each learning layer to extract depth features. A similar operation is repeated with the remaining set of depth images 204 for the entire set of RGB-D images in the training dataset 201 to obtain the second set of parameters (e.g., filter weights, biases, etc.) determined based on the pre-trained CNN 202 being fine-tuned using the depth images 204. Such pre-trained CNN 202 fine-tuned using the depth images 204 to yield the second set of parameters (e.g., filter weights, biases, etc.) may be referred to as the depth CNN 208. The second set of parameters may be stored in the database 316. At step 406, the cross-trained CNN module 320 can replicate the complete depth CNN to generate a duplicate depth CNN 212 that can be initialized with the second set of parameters.

At step 408, the duplicate depth CNN can be fine-tuned using the color image to generate a depth-enhanced color CNN. The cross-trained CNN module 320 can use the duplicate depth CNN 212, whose learning layers are initialized with the second set of parameters and includes the newly initialized ultimate fully-connected layer, may be further fine-tuned using the obtained color image such as the RGB image for the multidimensional images such as the RGB-D images received as the training dataset 201 by the image data analysis device 302. Similar to the fine-tuning of the pre-trained CNN 202 using the depth images 204, the duplicate depth CNN 212 may be fine-tuned using the color images 206 to yield a third set of parameters (e.g., filter weights, biases, etc.) and may be referred to as the depth-enhanced color CNN 214 as it leverages cross-training with both depth and color images 206. The third set of parameters may be stored in the database 316 by the cross-trained CNN module 320.

The method 400 can advantageously combine the color and depth information at an early stage of feature extraction that performs superior to conventional methods that do not combine the color and depth information at an early stage of feature extraction. The method 400 also advantageously uses both color and depth modalities together during training that may lead to increased object recognition accuracy even when only one modality is present during test time.

Figure 5:
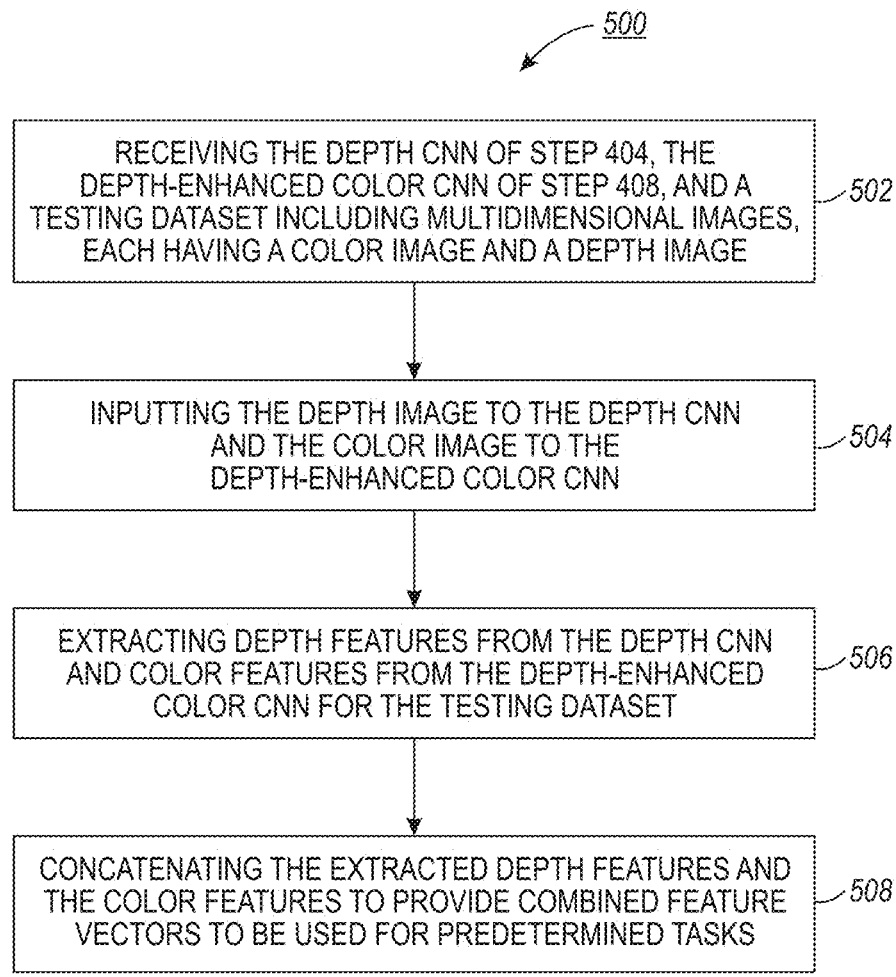
FIG. 5 is a flowchart illustrating an exemplary method for implementing a testing workflow using cross-trained convolutional neural networks obtained from the training workflow of FIG. 2, according to an embodiment of the present disclosure.

FIG. 5 is a flowchart illustrating an exemplary method for implementing a testing workflow using cross-trained CNNs obtained from the training workflow 200 of FIG. 2, according to an embodiment of the present disclosure. The exemplary method 500 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 500 is described is not intended to be construed as a limitation, and any number of the described method blocks may be combined or otherwise performed in any order to implement the method, or an alternate method. Additionally, individual blocks may be deleted from the method without departing from the spirit and scope of the present disclosure described herein. Furthermore, the method 300 may be implemented in any suitable hardware, software, firmware, or combination thereof, that exists in the related art or that is later developed.

The method 500 describes, without limitation, implementation of the exemplary testing workflow. One of skill in the art will understand that the method 500 may be modified appropriately for implementation in a various manners without departing from the scope and spirit of the disclosure.

At step 502, the depth CNN, the depth-enhanced color CNN, and a testing dataset including multidimensional images are received by the processor 308. The input module 318 retrieves the second set of parameters and the third set of parameters from the database 316 learned during training to implement the depth CNN 208 and depth-enhanced color CNN 214 as discussed above. Additionally, the input module receives a testing dataset including multidimensional images, each having a color image and a depth image. In one example, the training dataset 201 including the multidimensional images, as discussed above, may be divided into one or more splits. In each split, one object instance from every category may be extracted for testing and the remaining object instances may be used for training.

At step 504, the depth image may be inputted to the depth CNN 208 and the color image may be inputted to the depth-enhanced color CNN 214. Each of the depth CNN 208 and the depth-enhanced color CNN 214 may process the depth image and the color image respectively in a greedy-layer wise manner, as discussed above, to obtain an output at the corresponding ultimate fully-connected layers, such as the fully-connected layer 106-3.

At step 506, depth features can be extracted from the depth CNN and color features can be extracted from the depth-enhanced color CNN. The cross-trained CNN module 320 can extract the depth features 210 as activations from the penultimate fully-connected layer 106-2 of the depth CNN 208 for the testing dataset. Similarly, the color features 216 such as RGB features are extracted from the penultimate fully-connected layer 106-2 of the depth-enhanced color CNN 214 for the testing dataset. This is because the activations of the penultimate fully-connected layer 106-2 are more generic and are not based on any task or classifier being used.

At step 508, the extracted depth features and the color features are concatenated to provide a combined feature vector for each of the multidimensional images. In one embodiment, the cross-trained CNN module 320 performs matrix addition of a pair of depth image and a color image for each of the multidimensional images to provide the combined feature vector 218 for each multidimensional image in the testing dataset. Such combined feature vector 218 may be stored in the storage unit 312 by the cross-trained CNN module 320 or used for various computer vision tasks such as object recognition.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A computer-implemented method for training a convolutional neural network (CNN) that is pre-trained using a set of color images, the method comprising:
receiving, using an input module of a system memory, a training dataset including a plurality of multidimensional images, each multidimensional image including a color image and a depth image;
performing, using a processor, a fine-tuning of the pre-trained CNN using the depth image for each of the plurality of multidimensional images;
obtaining, using a cross-trained CNN module in the system memory, a depth CNN based on the pre-trained CNN, the depth CNN includes at least one convolutional layer in communication with an ultimate fully-connected layer via a penultimate fully-connected-layer, wherein the depth CNN is associated with a first set of parameters;
replicating, using the cross-trained CNN module, the depth CNN to obtain a duplicate depth CNN being initialized with the first set of parameters; and
obtaining, using the cross-trained CNN module, a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer of the depth-enhanced color CNN, wherein the depth-enhanced color CNN is associated with a second set of parameters.

2. The computer-implemented method of claim 1, wherein the second set of parameters are obtained by adjusting the first set of parameters based on the duplicate depth CNN being fine-tuned using the color image for one or more of the plurality of multidimensional images.

3. The computer-implemented method of claim 1, wherein the depth image is encoded across a plurality of channels being applied to the at least one convolutional layer of the depth CNN for each image pixel, wherein the plurality of channels include horizontal disparity, height above ground, and the angle the pixel's local surface normal makes with the inferred gravity direction.

4. The computer-implemented method of claim 1, wherein the depth image is replicated across one or more channels being applied to the at least one convolutional layer of the depth CNN for each image pixel.

5. The computer-implemented method of claim 1, wherein the color image is an RGB (Red, Green, Blue) image having three image channels, namely, a red image channel, a green image channel, and a blue image channel.

6. The computer-implemented method of claim 1, wherein each of the color image and the depth image is represented as a two-dimensional matrix.

7. The computer-implemented method of claim 1, wherein the first set of parameters includes neuron weights and biases.

8. The computer-implemented method of claim 1, further comprising testing the obtained depth CNN and the depth-enhanced color for object recognition, wherein the testing comprises:
   receiving the depth CNN, the depth-enhanced color CNN, and a testing dataset including a second plurality of multidimensional images, each of the second plurality of multidimensional images including a test color image and a test depth image;
   applying the test depth image to the depth CNN and the test color image to the depth-enhanced color CNN for each of the second plurality of multidimensional images;
   extracting depth features from the penultimate fully-connected layer of the depth CNN for each of the second plurality of multidimensional images;
   extracting color features from the penultimate fully-connected layer of the depth-enhanced color CNN for each of the second plurality of multidimensional images; and
   concatenating the extracted depth features and color features to generate a combine feature vector for each of the second plurality of multidimensional images.

9. The computer-implemented method of claim 8, wherein the testing dataset further includes at least one color image being applied to the depth-enhanced color CNN for extracting color features from the penultimate fully-connected layer of the depth-enhanced color CNN.

10. A device for training a convolutional neural network (CNN) that is pre-trained using a set of color images, the device comprising one or more processors configured to:
   receive using an input module a training dataset including a plurality of multidimensional images, each of the multidimensional images including a color image and a depth image;
   perform using a cross-trained CNN module a fine-tuning of the pre-trained CNN using the depth image for each of the plurality of multidimensional images;
   obtain using the cross-trained CNN module a depth CNN based on the pre-trained CNN, the depth CNN includes at least one convolutional layer in communication with an ultimate fully-connected layer via a penultimate fully-connected-layer, wherein the depth CNN is associated with a first set of parameters;
   replicate using the cross-trained CNN module the depth CNN to obtain a duplicate depth CNN being initialized with the first set of parameters; and
   obtain using the cross-trained CNN module a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer the depth-enhanced color CNN, wherein the depth-enhanced color CNN is associated with a second set of parameters.

11. The device of claim 10, wherein the second set of parameters are obtained by adjusting the first set of parameters based on the duplicate depth CNN being fine-tuned using the color image for one or more of the plurality of multidimensional images.

12. The device of claim 10, wherein the depth image is encoded across a plurality of channels being applied to the at least one convolutional layer of the depth CNN for each image pixel, wherein the plurality of channels include horizontal disparity, height above ground, and the angle the pixel's local surface normal makes with the inferred gravity direction.

13. The device of claim 10, wherein the depth image is replicated across three channels being applied to the at least one convolutional layer of the depth CNN for each image pixel.

14. The device of claim 10, wherein the color image is an RGB (Red, Green, Blue) image having three image channels, namely, red image channel, green image channel, and blue image channel.

15. The device of claim 10, wherein each of the color image and the depth image is represented as a two-dimensional matrix.

16. The device of claim 10, wherein the first set of parameters includes neuron weights and biases.

17. The device of claim 10, further comprising testing the obtained depth CNN and the depth-enhanced color CNN for object recognition, wherein the device comprises one or more processors configured to:
   receive using the input module a testing dataset including a second plurality of multidimensional images, each of the second plurality of multidimensional images including a test color image and a test depth image;
   input using a classification module the test depth image to the depth CNN and the test color image to the depth-enhanced color CNN for each of the second plurality of multidimensional images;
   extract using the classification module depth features from the penultimate fully-connected layer of the depth CNN for each of the second plurality of multidimensional images;
   extract using the classification module color features from the penultimate fully-connected layer of the depth-enhanced color CNN for each of the second plurality of multidimensional images; and
   concatenate using the classification module the extracted depth features and color features to generate a combine feature vector for each of the second plurality of multidimensional images.

18. The device of claim 17, wherein the testing dataset further includes at least one color image being applied to the depth-enhanced color CNN for extracting color features from the penultimate fully-connected layer of the depth-enhanced color CNN.

19. A non-transitory computer-readable medium comprising computer-executable instructions for training a convolutional neural network (CNN) that is pre-trained using a set of color images, the non-transitory computer-readable medium comprising instructions for:
   receiving a training dataset including a plurality of multidimensional images, each multidimensional image including a color image and a depth image;

performing, using a processor, a fine-tuning of the pre-trained CNN using the depth image for each of the plurality of multidimensional images;

obtaining a depth CNN based on the pre-trained CNN, the depth CNN includes at least one convolutional layer in communication with an ultimate fully-connected layer via a penultimate fully-connected-layer, wherein the depth CNN is associated with a first set of parameters;

replicating the depth CNN to obtain a duplicate depth CNN being initialized with the first set of parameters; and obtaining a depth-enhanced color CNN based on the duplicate depth CNN being fine-tuned using the color image for each of the plurality of multidimensional images, the depth-enhanced color CNN includes at least one convolutional layer in communication with an ultimate fully-connected layer of the depth-enhanced color CNN via a penultimate fully-connected-layer of the depth-enhanced color CNN, wherein the depth-enhanced color CNN is associated with a second set of parameters.

20. The non-transitory computer-readable medium of claim 19, wherein the second set of parameters are obtained by adjusting the first set of parameters based on the duplicate depth CNN being fine-tuned using the color image for one or more of the plurality of multidimensional images.

21. The non-transitory computer-readable medium of claim 19, wherein the depth image is encoded across a plurality of channels being applied to the at least one convolutional layer of the depth CNN for each image pixel, wherein the plurality of channels include horizontal disparity, height above ground, and the angle the pixel's local surface normal makes with the inferred gravity direction.

22. The non-transitory computer-readable medium of claim 19, wherein the depth image is replicated across one or more channels being applied to the at least one convolutional layer of the depth CNN for each image pixel.

23. A The non-transitory computer-readable medium of claim 19, wherein the color image is an RGB (Red, Green, Blue) image having three image channels, namely, a red image channel, a green image channel, and a blue image channel.

24. The non-transitory computer-readable medium of claim 19, wherein each of the color image and the depth image is represented as a two-dimensional matrix.

25. The non-transitory computer-readable medium of claim 19, wherein the first set of parameters includes neuron weights and biases.

26. The non-transitory computer-readable medium of claim 19, further comprising testing the obtained depth CNN and the depth-enhanced color CNN for object recognition, wherein the testing comprises:

receiving the depth CNN, the depth-enhanced color CNN, and a testing dataset including a second plurality of multidimensional images, each of the second plurality of multidimensional images including a test color image and a test depth image;

applying the test depth image to the depth CNN and the test color image to the depth-enhanced color CNN for each of the second plurality of multidimensional images;

extracting depth features from the penultimate fully-connected layer of the depth CNN for each of the second plurality of multidimensional images;

extracting color features from the penultimate fully-connected layer of the depth-enhanced color CNN for each of the second plurality of multidimensional images; and concatenating the extracted depth features and color features to generate a combine feature vector for each of the second plurality of multidimensional images.

27. The non-transitory computer-readable medium of claim 26, wherein the testing dataset further includes at least one color image being applied to the depth-enhanced color CNN for extracting color features from the penultimate fully-connected layer of the depth-enhanced color CNN.

* * * * *